US012058965B1

(12) United States Patent
Thompson et al.

(10) Patent No.: US 12,058,965 B1
(45) Date of Patent: *Aug. 13, 2024

(54) PLANT COVER WITH INSECT RESISTANT BAG FOR ENCLOSING A PLANT

(71) Applicant: Tree Defender, LLC, Dundee, FL (US)

(72) Inventors: Scott K. Thompson, Winter Haven, FL (US); Thomas A. Thayer, Jr., Winter Haven, FL (US)

(73) Assignee: TREE DEFENDER, LLC, Dundee, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/161,166

(22) Filed: Jan. 30, 2023

Related U.S. Application Data

(63) Continuation of application No. 17/817,732, filed on Aug. 5, 2022, now Pat. No. 11,730,092, which is a
(Continued)

(51) Int. Cl.
*A01G 13/10* (2006.01)
*A01G 13/02* (2006.01)
(Continued)

(52) U.S. Cl.
CPC ....... *A01G 13/105* (2013.01); *A01G 13/0237* (2013.01); *A01G 13/043* (2013.01); *A01G 17/00* (2013.01); *A01G 2013/046* (2013.01)

(58) Field of Classification Search
CPC .............. A01G 13/105; A01G 13/0237; A01G 13/043; A01G 17/00; A01G 2013/046
See application file for complete search history.

(56) References Cited

U.S. PATENT DOCUMENTS

| 614,921 A | 11/1898 | Zimmerman |
| 633,528 A | 9/1899 | Morris |

(Continued)

FOREIGN PATENT DOCUMENTS

| CA | 2559759 | 3/2007 | |
| CA | 2559759 A1 * | 3/2007 | ......... A01G 13/0237 |

(Continued)

OTHER PUBLICATIONS

Chris Thiele "How different coloors of light affect plant growth" https://www.grobo.io/blogs/grobo/how-different-colors-of-light-affect-plant-growth; May 29, 2018 pp. 8.
(Continued)

*Primary Examiner* — Ebony E Evans
(74) *Attorney, Agent, or Firm* — Allen, Dyer, Doppelt + Gilchrist, PA

(57) ABSTRACT

A plant cover device comprises an enclosure having mesh material to define a plant-receiving cavity. The enclosure includes a first mesh section having a closed top end, and a first perimeter opposite the closed top end, and a second mesh section having a second perimeter attached to the first perimeter of the first mesh section, and a bottom end opposite the closed top end of the first mesh section defining a trunk receiving opening. The plant cover device also includes a support extending vertically from a ground surface through the first and second perimeters and to abut the closed top end of the enclosure.

24 Claims, 10 Drawing Sheets

Related U.S. Application Data continuation of application No. 17/412,447, filed on Aug. 26, 2021, now Pat. No. 11,406,068, which is a continuation of application No. 15/359,111, filed on Nov. 22, 2016, now Pat. No. 11,122,752.

(60) Provisional application No. 62/259,188, filed on Nov. 24, 2015.

(51) Int. Cl.
  *A01G 13/04* (2006.01)
  *A01G 17/00* (2006.01)

(56) References Cited

U.S. PATENT DOCUMENTS

| | | | |
|---|---|---|---|
| 1,233,099 A | 7/1917 | Miller | |
| 1,446,416 A | 2/1923 | Curtiss | |
| 1,834,084 A | 12/1931 | Barnes | |
| 1,978,921 A | 10/1934 | Wade | |
| 2,006,562 A | 7/1935 | Scheu | |
| 2,014,175 A | 9/1935 | Hart | |
| 2,097,929 A | 11/1937 | Lovett, Jr. | |
| 2,197,929 A * | 4/1940 | Hale | A01G 13/04 47/2 |
| 2,617,437 A | 11/1952 | Sherman | |
| 2,781,811 A | 2/1957 | Dilar | |
| 2,812,900 A | 11/1957 | Matthews | |
| 2,943,634 A | 7/1960 | Morgan | |
| 3,419,024 A | 12/1968 | Nickerson, Jr. | |
| 3,441,037 A | 4/1969 | Transeau | |
| 3,477,453 A | 11/1969 | Ulisse | |
| 3,490,469 A | 1/1970 | Dubinsky | |
| 3,706,160 A | 12/1972 | Deibert | |
| 3,860,022 A | 1/1975 | Arndt | |
| 3,899,168 A | 8/1975 | Besherse | |
| 4,054,166 A | 10/1977 | Burke | |
| 4,341,039 A | 7/1982 | Reese | |
| 4,384,604 A | 5/1983 | DeLaura et al. | |
| 4,646,467 A | 3/1987 | Morrisroe | |
| 4,665,646 A | 5/1987 | Anderson | |
| 4,682,436 A | 7/1987 | Ritson | |
| D294,538 S | 3/1988 | De Marr | |
| 4,763,440 A | 8/1988 | James | |
| 4,768,307 A | 9/1988 | Holowecky | |
| 4,787,173 A | 11/1988 | Lewis | |
| 4,799,520 A | 1/1989 | Blackburn et al. | |
| 4,969,555 A | 11/1990 | Fitzgerald | |
| 4,980,991 A | 1/1991 | Kipnees et al. | |
| 5,016,388 A | 5/1991 | Burress et al. | |
| 5,172,712 A | 12/1992 | Robinson | |
| 5,179,798 A | 1/1993 | Sonagere | |
| 5,224,967 A | 7/1993 | Rolf et al. | |
| 5,233,788 A | 8/1993 | Jackson, Jr. | |
| 5,259,408 A | 11/1993 | Guerin | |
| 5,291,999 A | 3/1994 | Phair | |
| 5,359,810 A | 11/1994 | Aul | |
| 5,456,043 A | 10/1995 | Dacon, Sr. | |
| 5,582,115 A | 12/1996 | Muller | |
| 5,590,775 A | 1/1997 | Moore | |
| 5,664,595 A | 9/1997 | Vonderhorst et al. | |
| 5,678,587 A | 10/1997 | Bilotti | |
| 5,930,948 A | 8/1999 | Daniel | |
| 6,088,953 A | 7/2000 | Morgan | |
| 6,698,135 B1 * | 3/2004 | Robbins | A01G 13/043 47/30 |
| 6,698,440 B2 | 3/2004 | Beyer et al. | |
| 6,810,618 B1 * | 11/2004 | Hauser | A01G 13/043 47/29.6 |
| D499,880 S | 12/2004 | Wright | |
| 7,047,992 B1 * | 5/2006 | Fluellen | E04H 15/26 135/136 |
| 7,497,048 B2 | 3/2009 | Bakowski | |
| 7,637,053 B1 * | 12/2009 | McAnulty | A01G 13/043 47/23.1 |
| 7,866,089 B2 | 1/2011 | Iwig et al. | |
| D655,774 S | 3/2012 | Novak | |
| 8,986,170 B2 | 3/2015 | Sherstnev et al. | |
| 9,215,945 B2 | 12/2015 | PeCoy | |
| 9,462,860 B1 | 10/2016 | Whetstone, Jr. | |
| 9,603,423 B1 | 3/2017 | Skobeleva | |
| D787,283 S | 5/2017 | Horvath | |
| 9,814,188 B2 | 11/2017 | Almudhyan | |
| 9,894,847 B2 * | 2/2018 | Cruz | A01G 13/06 |
| 11,122,752 B1 | 9/2021 | Thompson | |
| 11,406,068 B2 | 8/2022 | Thompson | |
| 11,497,176 B2 | 11/2022 | Thompson et al. | |
| 11,503,777 B2 | 11/2022 | Thompson et al. | |
| 2001/0051240 A1 | 12/2001 | Denis | |
| 2003/0009936 A1 | 1/2003 | Hodson | |
| 2003/0182851 A1 | 10/2003 | Lin | |
| 2004/0040199 A1 | 3/2004 | Thompson et al. | |
| 2005/0086858 A1 | 4/2005 | Schmidt | |
| 2005/0155284 A1 | 7/2005 | Kulas | |
| 2005/0172548 A1 | 8/2005 | Bement | |
| 2005/0268544 A1 | 12/2005 | Maffei | |
| 2006/0059775 A1 | 3/2006 | L'Estrange | |
| 2006/0272202 A1 | 12/2006 | Gaudet | |
| 2007/0062106 A1 | 3/2007 | Dunbar et al. | |
| 2007/0062171 A1 | 3/2007 | Roberts | |
| 2007/0079548 A1 | 4/2007 | Bakowski | |
| 2007/0186466 A1 | 8/2007 | Gardiner | |
| 2009/0151242 A1 * | 6/2009 | Kellogg | A01G 13/043 47/29.6 |
| 2009/0205248 A1 | 8/2009 | Phelps | |
| 2010/0154848 A1 | 6/2010 | Meibos et al. | |
| 2010/0170818 A1 | 7/2010 | Lin | |
| 2010/0172601 A1 | 7/2010 | Lin | |
| 2011/0314731 A1 | 12/2011 | Toye | |
| 2012/0005952 A1 | 1/2012 | Lohse et al. | |
| 2012/0144736 A1 | 6/2012 | Williams | |
| 2013/0219783 A1 | 8/2013 | Toye | |
| 2013/0239472 A1 | 9/2013 | Toye | |
| 2014/0157662 A1 | 6/2014 | Wallace et al. | |
| 2014/0196364 A1 | 7/2014 | Mayner | |
| 2016/0205874 A1 | 7/2016 | Wallace et al. | |
| 2017/0282173 A1 | 10/2017 | Huang et al. | |
| 2017/0339849 A1 * | 11/2017 | Masri | A01G 13/043 |
| 2018/0007980 A1 | 1/2018 | Butler | |
| 2019/0191636 A1 * | 6/2019 | Livingston, Sr. | A01G 13/043 |
| 2020/0154650 A1 | 5/2020 | Thompson | |
| 2020/0253135 A1 | 8/2020 | Thompson | |
| 2022/0061233 A1 * | 3/2022 | Peace | A01G 13/0212 |
| 2022/0264810 A1 | 8/2022 | Thompson | |
| 2022/0369574 A1 | 11/2022 | Thompson et al. | |

FOREIGN PATENT DOCUMENTS

| | | | |
|---|---|---|---|
| DE | 9418837 | 4/1955 | |
| FR | 2284734 | 4/1976 | |
| FR | 2504352 | 10/1982 | |
| FR | 2643934 | 9/1990 | |
| GB | 1242580 | 8/1971 | |
| GB | 2098247 | 11/1982 | |
| GB | 2420262 | 5/2006 | |
| JP | H11225591 | 8/1999 | |
| WO | WO03096791 | 11/2003 | |
| WO | WO-2007059345 A2 * | 5/2007 | A01G 13/0237 |
| WO | WO-2015193800 A2 * | 12/2015 | A01G 13/0206 |

OTHER PUBLICATIONS

Gaire et al. "Individual protective covers (IPCs) to prevent Asian citrus psyllid and Candidatus Liberibacter" www.elsevier.com/locate/cropro Crop Protection 152 (2022) 105862 pp. 11.

Klein et al. "Effects of Near Ultraviolet and Green Radiations on Plant Growth" Plant Physiology Mar. 29, 1965; pp. 4.

U.S. Appl. No. 18/053,045; Thompson et al.

* cited by examiner

PLANT COVER WITH INSECT RESISTANT BAG FOR ENCLOSING A PLANT

RELATED APPLICATION

This application is a continuation of application Ser. No. 17/817,732 filed Aug. 5, 2022, which is a continuation of application Ser. No. 17/412,447 filed on Aug. 26, 2021, now U.S. Pat. No. 11,406,068, which is a continuation of application Ser. No. 15/359,111 filed Nov. 22, 2016, now U.S. Pat. No. 11,122,752, which claims priority to U.S. Provisional Application No. 62/259,188 filed Nov. 24, 2015, the subject matter of these applications is incorporated herein by reference in its entirety.

TECHNICAL FIELD

The present disclosure relates to the field of plant cover device, and, more particularly, to insect repelling plant cover devices and related methods.

BACKGROUND

Citrus greening, also known as Huanglongbing (HLB) or yellow dragon disease, is one of the most serious citrus plant diseases in the world because there is currently no cure. The disease has devastated millions of acres of citrus crops throughout the United States and abroad.

Citrus greening disease is spread by a disease-infected insect, the Asian citrus psyllid, and has put the future of America's citrus at risk. Infected trees produce fruits that are green, misshapen and bitter, unsuitable for sale as fresh fruit or for juice. Most infected trees die within a few years.

The Asian citrus psyllid is no bigger than the head of a pin yet has become the most dangerous insect pest to Florida's citrus crops. The infected insect spreads the disease as it feeds on the leaves and stems of citrus trees. Citrus greening disease is further spread by moving infected plants and plant materials.

The disease is typically managed using insecticides to control the psyllid population. Evidence shows that reducing psyllid populations via insecticide application not only slows the rate of HLB spread but also reduces severity of the disease once established.

Young trees that produce multiple flushes throughout the year are at greater risk of greening infection than mature trees because of the attraction of adult psyllids to the new flush. Even without the disease, young trees need to be protected for about four years from psyllids and leaf miners to grow optimally. Soil-applied systemic insecticides provide long lasting control of psyllids, but the chemicals may be environmentally harmful.

Others have developed tree covers that enclose a tree to prevent insect infiltration. Conventional tree covers, however, suffer from one or more drawbacks. The tree cover may rest its weight against the tree, which can damage foliage and branches of young trees. Some tree covers may have a Skelton-like framework that prevents the cover from resting against the foliage, but the framework makes the cover more complicated to install.

SUMMARY

Generally, an individual plant cover device comprises an enclosure having mesh material to define a plant-receiving cavity therein. The enclosure includes a first mesh section having a closed top end, and a first perimeter opposite the closed top end, and a second mesh section having a second perimeter being integral with the first perimeter of the first mesh section, and a bottom end opposite the closed top end of the first mesh section defining a trunk receiving opening. The first perimeter and the second perimeter partially define the plant-receiving cavity. The individual plant cover device also includes a support extending vertically from a ground surface through the first and second perimeters and to abut the closed top end of the enclosure.

In some embodiments, the support may comprise a vertical support extending vertically from the ground surface to abut the closed top end of the enclosure, and a plurality of arms extending horizontally from the vertical support to support the enclosure. In particular, the first mesh section may be dome-shaped or pyramid-shaped. The second mesh section may comprise tapering sides.

Also, the support may comprise a tubular stake, and a cap on a top end of the tubular stake. The individual plant cover device may also include a closure device wrapped around the second mesh section of the enclosure adjacent the bottom end. The individual plant cover device may include a fastener adjacent a peripheral edge of the second mesh section of the enclosure and extending from the trunk receiving opening. The support may comprise a stake, and a cap over the stake, the cap to abut the closed top end of the enclosure.

Another aspect is directed to an individual plant cover assembly comprising a plant, a support extending vertically from a ground surface adjacent the plant, and an enclosure to be positioned over the support and the plant. The enclosure has mesh material to define a plant-receiving cavity therein and comprises a first mesh section having a closed top end, and a first perimeter opposite the closed top end, and a second mesh section having a second perimeter being integral with the first perimeter of the first mesh section, and a bottom end opposite the closed top end of the first mesh section defining a trunk receiving opening. The first perimeter and the second perimeter partially define the plant-receiving cavity. The support extends through the first and second perimeters and to abut the closed top end of the enclosure.

Yet another aspect is directed to a method of covering a plant with an individual plant cover device. The method comprises providing the individual plant cover device with an enclosure comprising enclosure having mesh material to define a plant-receiving cavity therein. The enclosure comprises a first mesh section having a closed top end, and a first perimeter opposite the closed top end, and a second mesh section having a second perimeter being integral with the first perimeter of the first mesh section, and a bottom end opposite the closed top end of the first mesh section defining a trunk receiving opening. The first perimeter and the second perimeter partially define the plant-receiving cavity. The method also includes positioning the plant within the individual plant cover device by lowering the enclosure over the plant through the plant receiving opening, and suspending the enclosure with a support extending vertically from a ground surface to abut the closed top end of the enclosure, the support extending through the first and second perimeters to abut the closed top end of the enclosure.

DETAILED DESCRIPTION

This disclosure describes example aspects and embodiments, but not all possible aspects and embodiments of the plant cover and related methods. Where a particular feature is disclosed in the context of a particular aspect or embodiment, that feature can also be used, to the extent possible, in combination with and/or in the context of other aspects and embodiments. The plant cover may be embodied in many different forms and should not be construed as limited to only the embodiments described here.

Young citrus trees are at greater risk than mature trees of infection because of frequent leaf flush (fresh growth) which attracts the psyllid as well as many other pests as the young tree grows. The plant cover system described here may advantageously be used to protect young citrus trees for the first three years and beyond after planting. However, it should be recognized that the cover can also be used on a wide variety, size, and age of fruit trees, ornamentals, vegetables, and the like.

It is to be understood that the term "plant" as used herein may include trees. For example "a plant cover" refers to a cover for trees and other plants.

Figure 1:
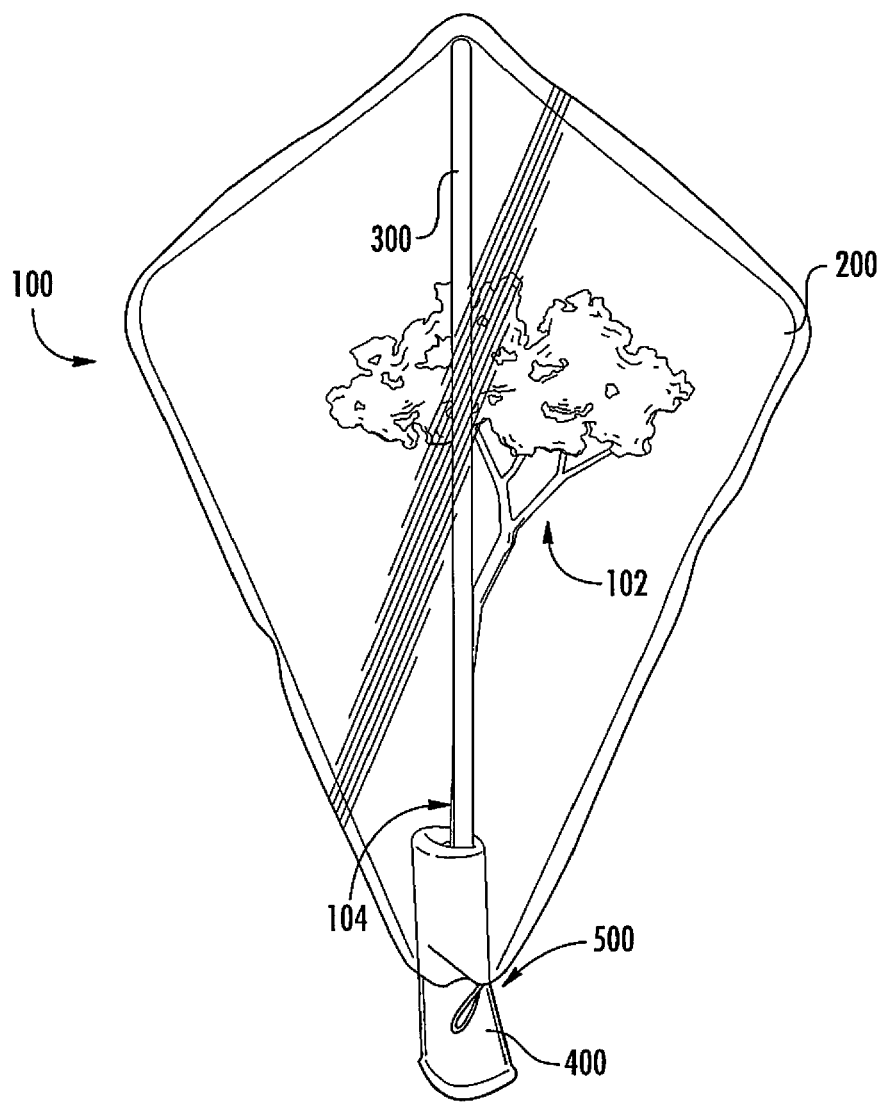
FIG. 1 is a perspective view of a first example of the plant cover system installed so as to enclose a young tree.
Figure 2:
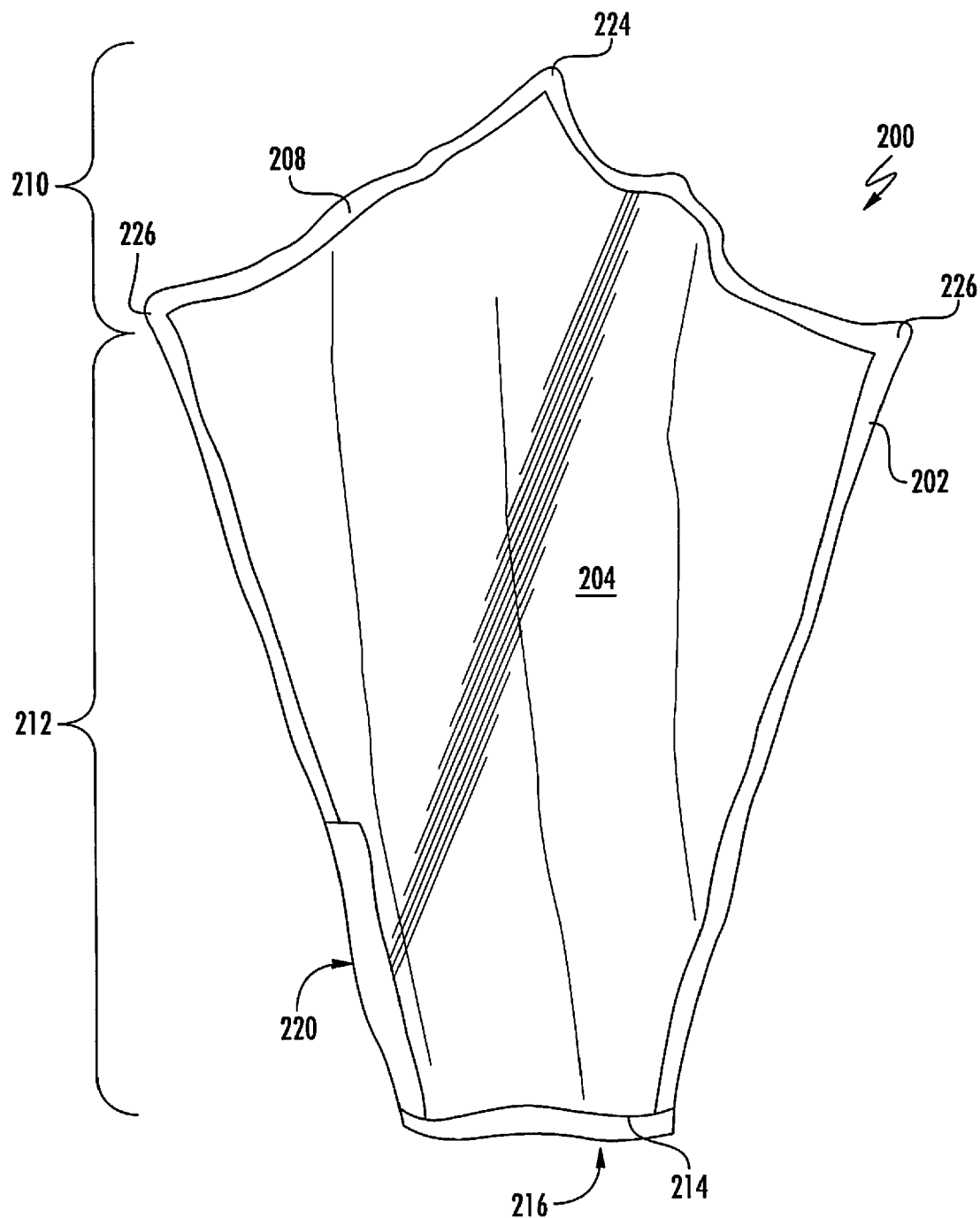
FIG. 2 is a front view of an example of the plant cover bag.
Figure 3:
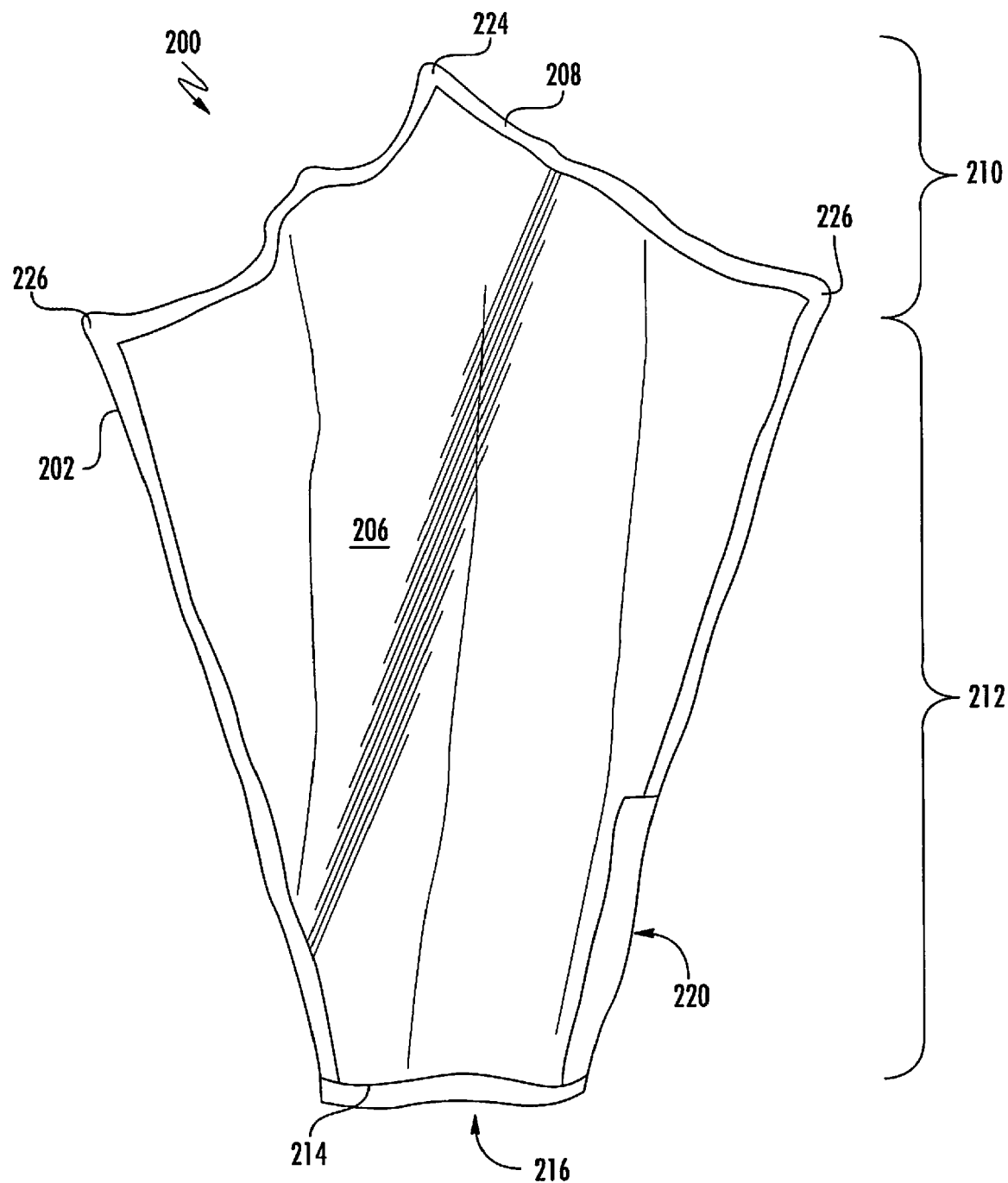
FIG. 3 is a back view thereof.
Figure 4:
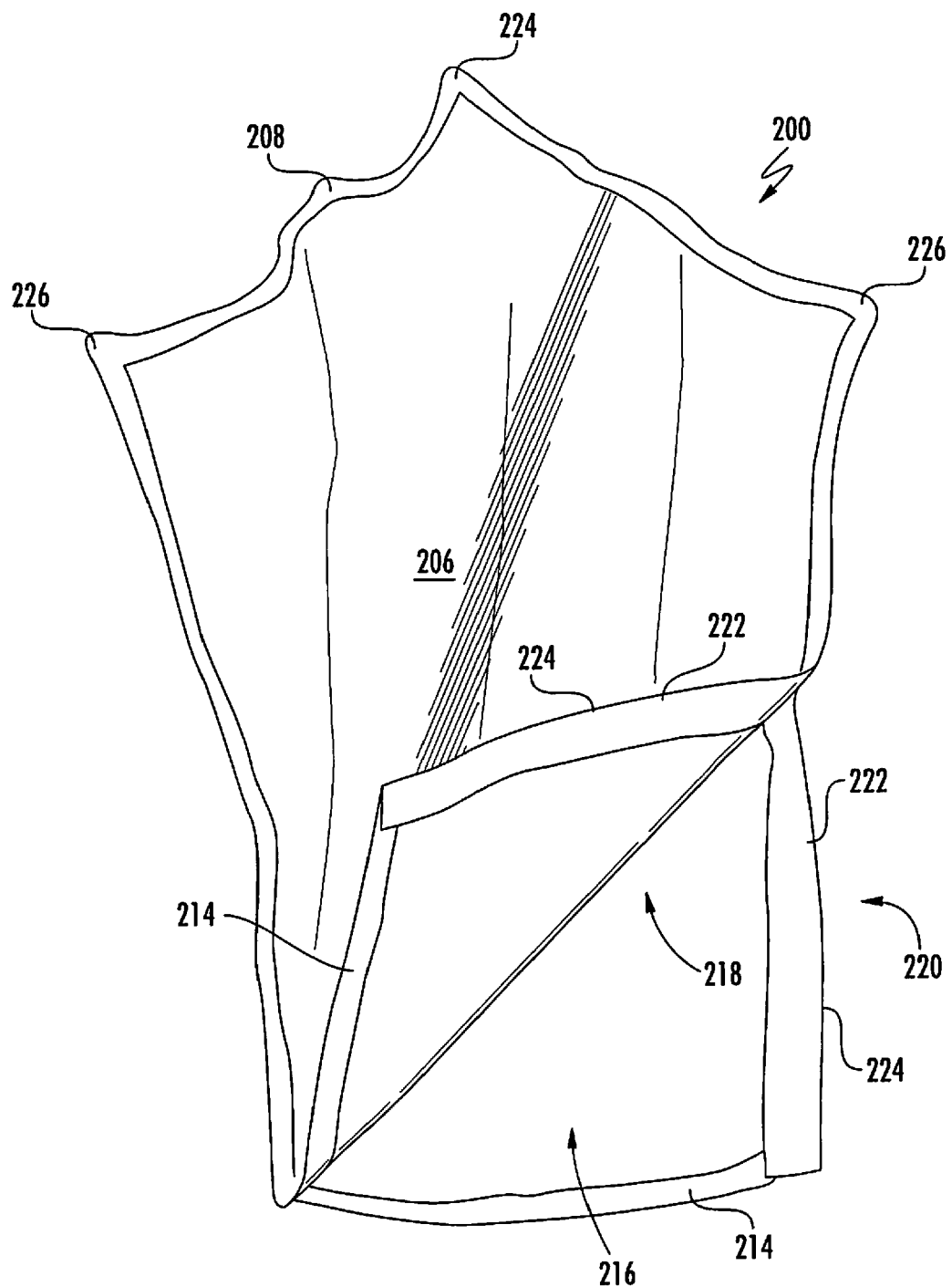
FIG. 4 is another back view of the plant cover bag showing the margins separated to increase the size of the opening.

Referring to FIG. 1, a first example embodiment of the plant cover system 100 includes a plant cover bag 200 upwardly supported by a vertical support member 300 over a tree 102. The bottom of the bag 200 is closed around the trunk 104 of the tree 102. An optional trunk cover 400 encircles the trunk. A closure 500 closes the bottom of the bag 200 around the trunk 104.

Additional details of the bag 200 are now described with reference to FIGS. 2-6.

The bag 200 has a generally kite shaped exterior perimeter 202 and is formed from a first kite shaped panel 204 and a second kite shaped panel that are joined together along a seam 208 forming the exterior perimeter 202 by a conventional joining mechanism such as using an adhesive, sewing, stapling, or the like.

The seam 208 adds rigidity to the exterior perimeter 202, allowing the exterior perimeter 202 to maintain its kite shape without a separate support frame when suspended over a tree. This allows the midsection of the bag 200 to bulge out around the tree's foliage so that the bag 200 does not rest its weight against the foliage.

An upper section 210 of the bag 200 is generally triangle shaped. A lower section 212 of the bag 200 is generally trapezoid shaped. A bottom end of the bag 200 includes a rim 214 that circumscribes an opening 216 to the bag's interior 218.

A slot 220 interrupts the seam 208, extends vertically from the opening 216, and includes a pair of opposed margins 222 that include cooperatively interlocking parts 224 that can temporarily be joined and separated to increase the size of the opening when installing over a plant. The interlocking joining mechanism for the margins 222 may be a hook and loop type closure such as VELCRO, a zipper, or the like. The entire length of the slot 220 may be completely closed to prevent insects from entering through the slot 220.

Figure 5:
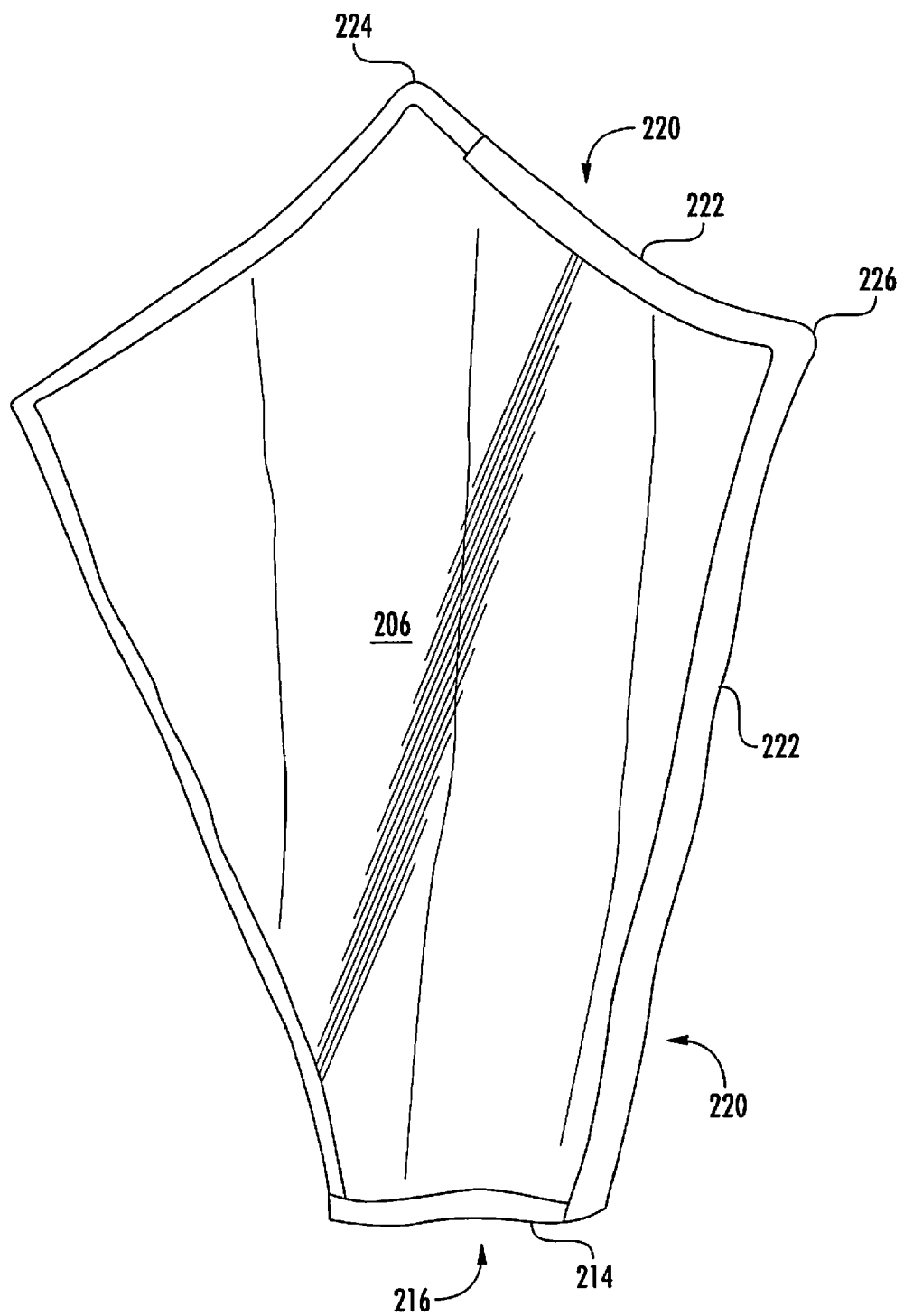
FIG. 5 is a back view of another example of the plant cover bag with a slot that extends to the upper section of the bag.
Figure 6:
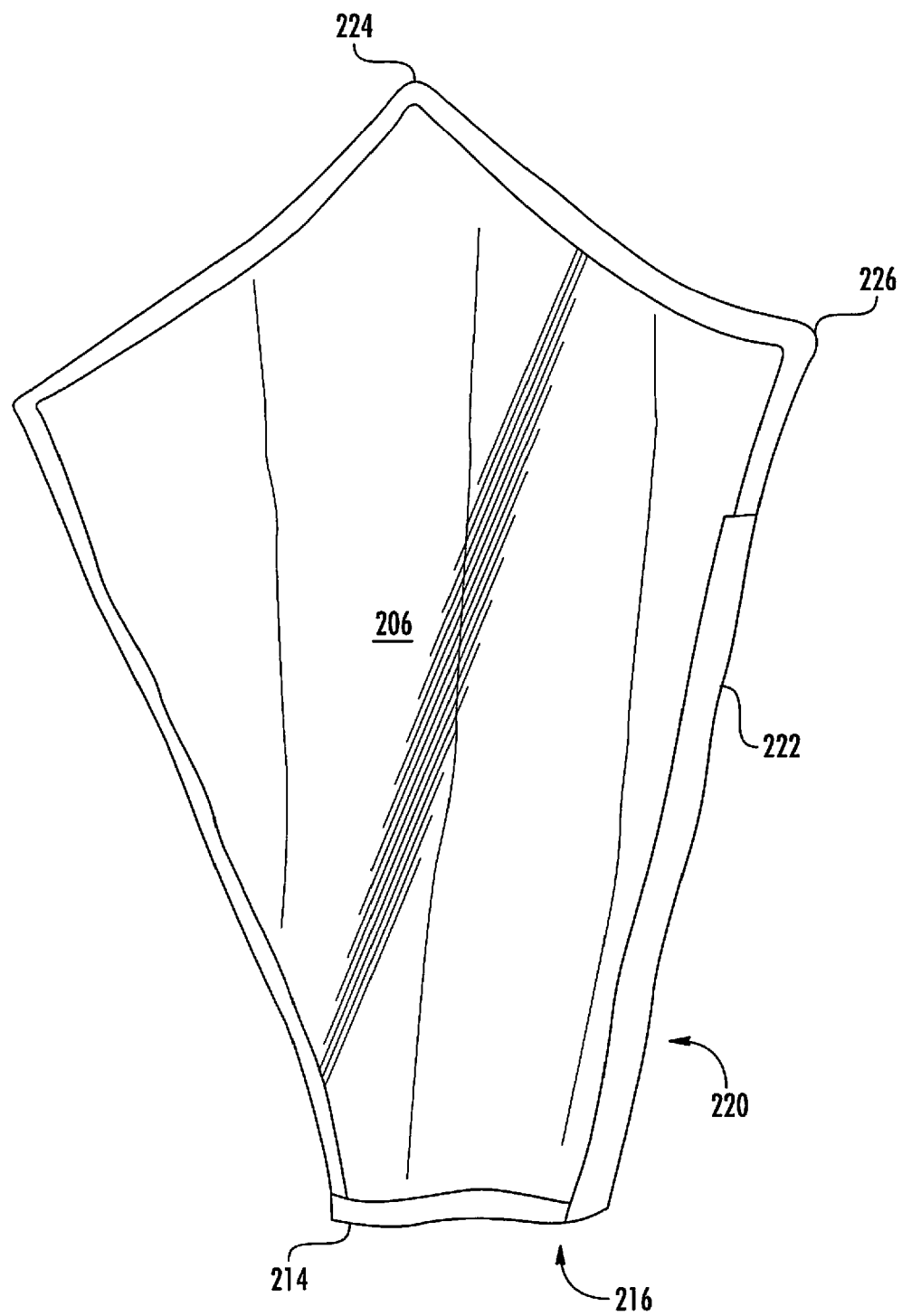
FIG. 6 is a back view of another example of the plant cover bag with a slot that extends closer to the side apex than in the first example.
Figure 7:
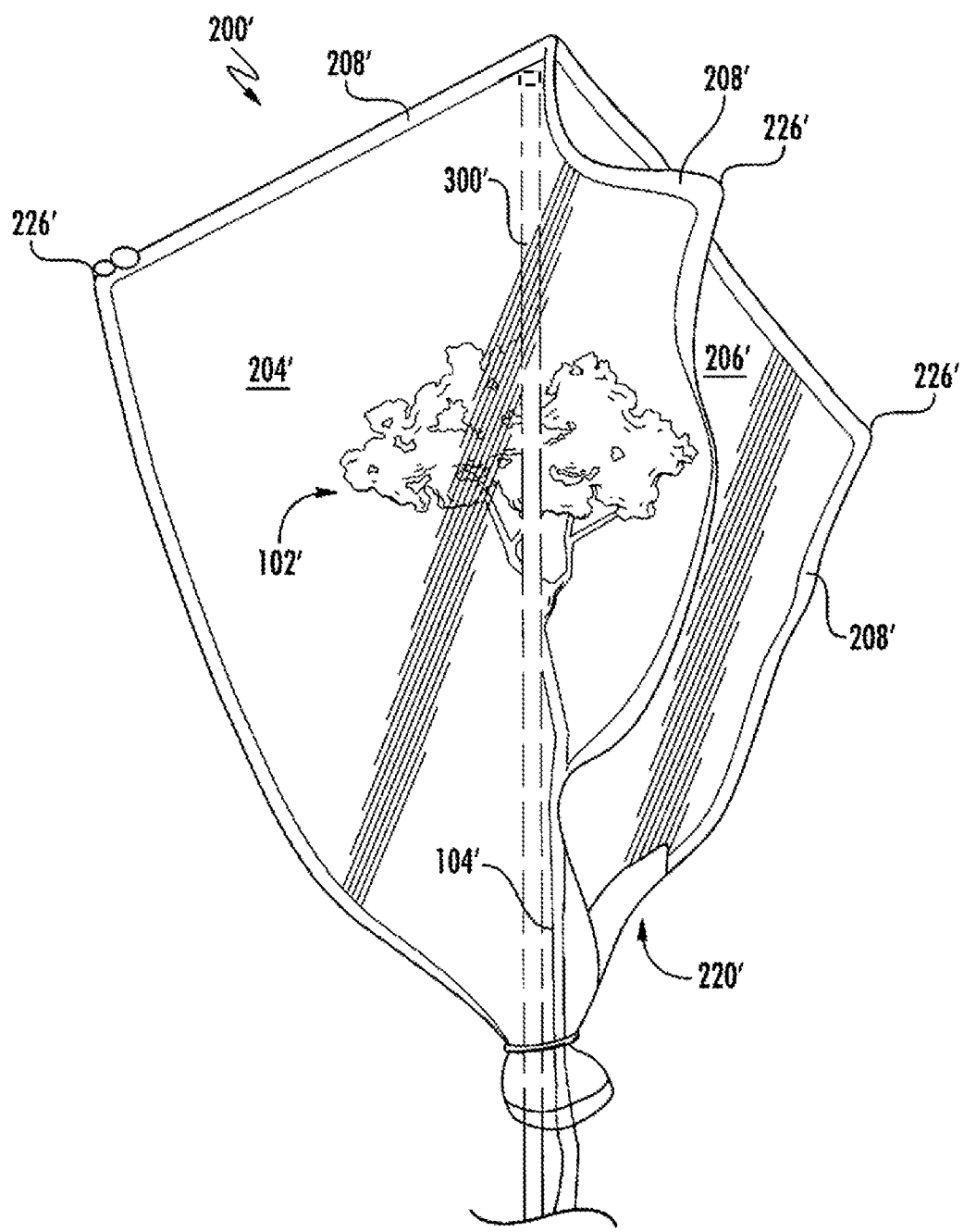
FIG. 7 is a perspective view of a second example of the plant cover system installed so as to enclose a young tree.

Referring to FIGS. 5 and 6, the length of the slot 220 may vary among different examples to accommodate different sizes and shapes of plants and trees. In the example of FIG. 6, the slot 220 extends from the opening 216 to the upper section 210 of the bag 200 and terminates before reaching the bag's top apex 224. In the example of FIG. 7, the slot 220 extends from the opening 216 and part of the way to the side apex 226. If the plant being covered is a fruit or vegetable plant, the extended slot 220 can be opened to harvest the fruits or vegetables from the plant and then closed.

The panels 204, 206 form a wall that encloses the interior of the bag 200. The panels 204, 206 may be made at least partially or completely of a mesh material, which provides water permeability and light transmissivity, but prevents intrusion by small insects such as psyllids. The mesh size may be, for example, 50 mesh or 50 by 25 threads per square inch. Such a mesh size will be sufficient to prevent intrusion by psyllids, aphids, white flies, mealy bugs, leaf miners, thrips, grasshoppers, ants, and orange dogs. The bag 200 may also protect the enclosed foliage from frost, hail, and wind damage.

Figure 8:
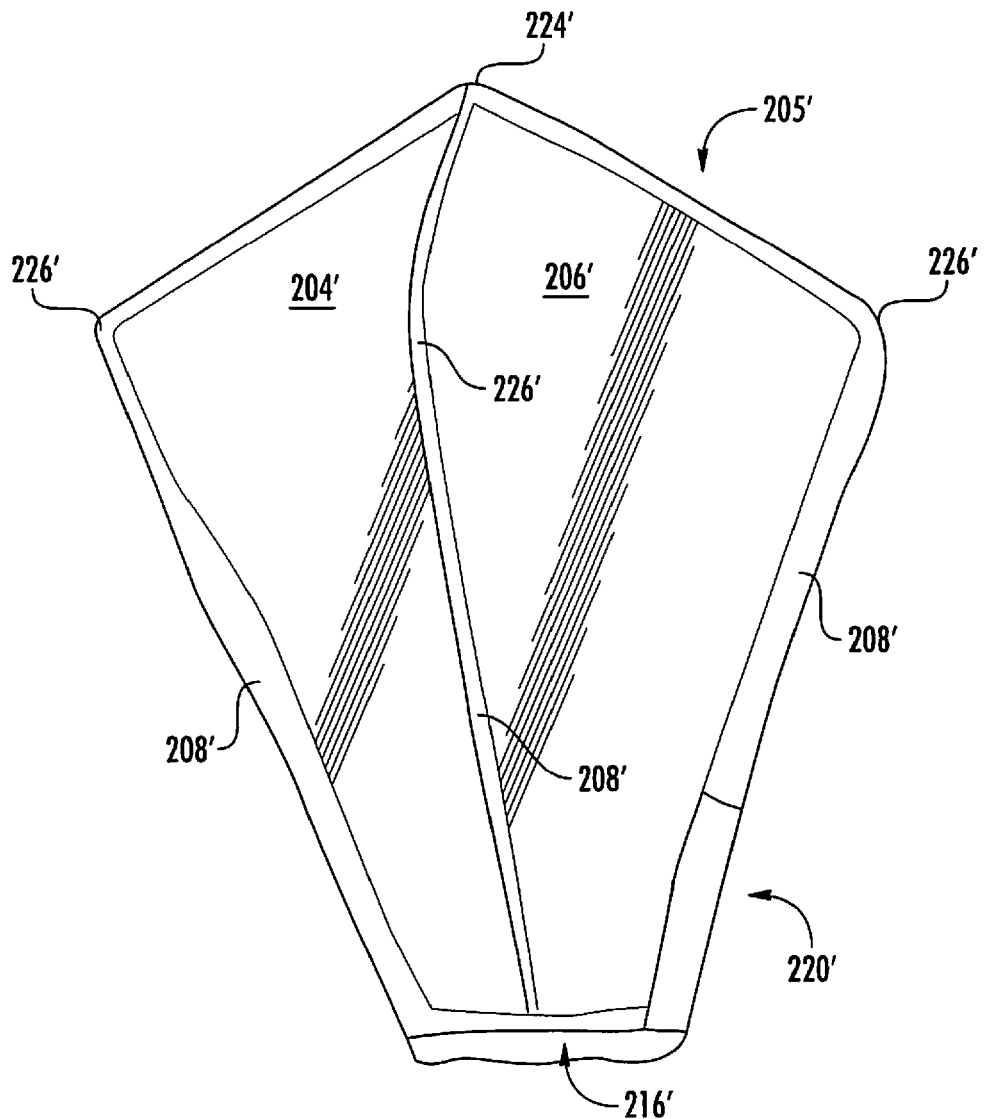
FIG. 8 is a front view of the bag in the second example.
Figure 9:
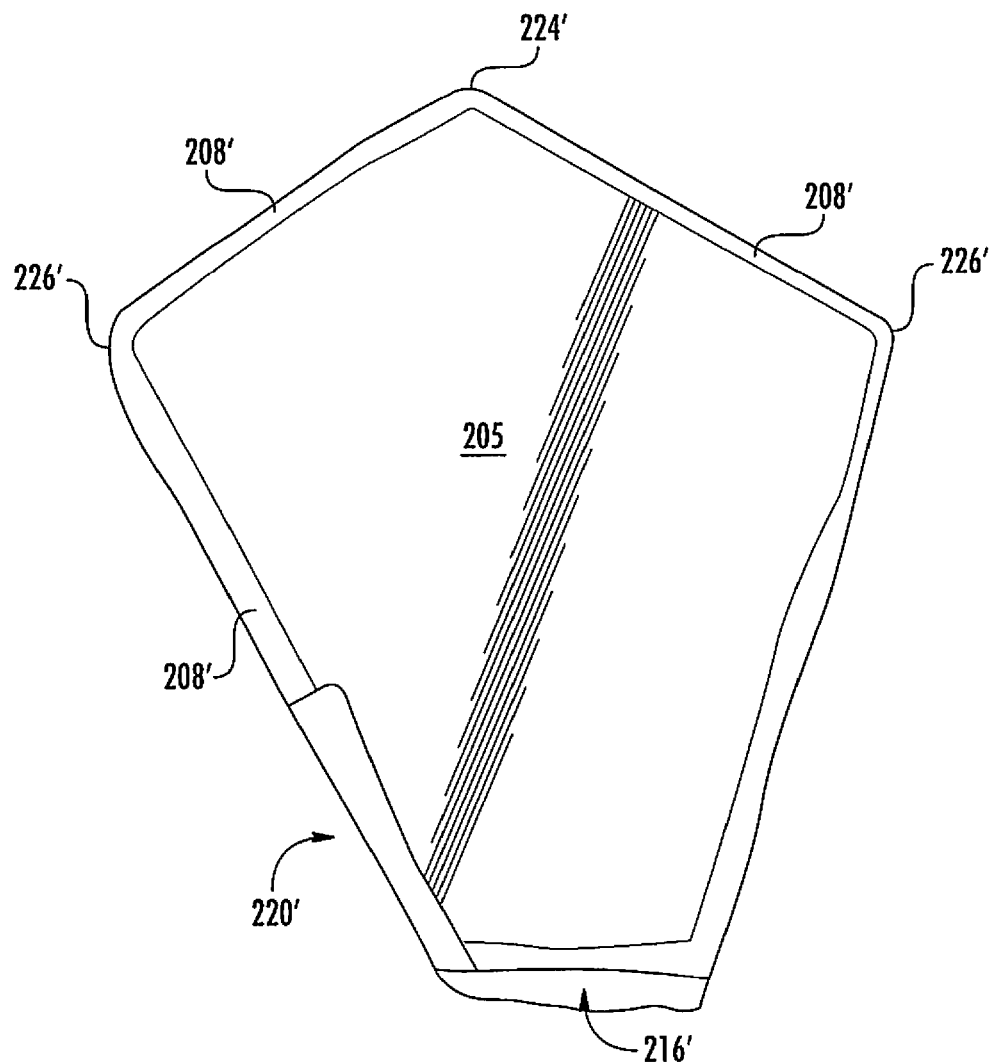
FIG. 9 is a back view thereof.

Referring to FIGS. 7-9 a second example embodiment of the bag 200' includes three kite shaped panels instead of two. In FIGS. 7-9 a prime symbol (') denotes features corresponding to the previous example. The three kite shaped panels 204', 205, and 206' are joined together at the seam 208' so that the bag has three side vertices 226'. This configuration provides more interior volume than in the first example to accommodate larger plants and trees.

Figure 10:
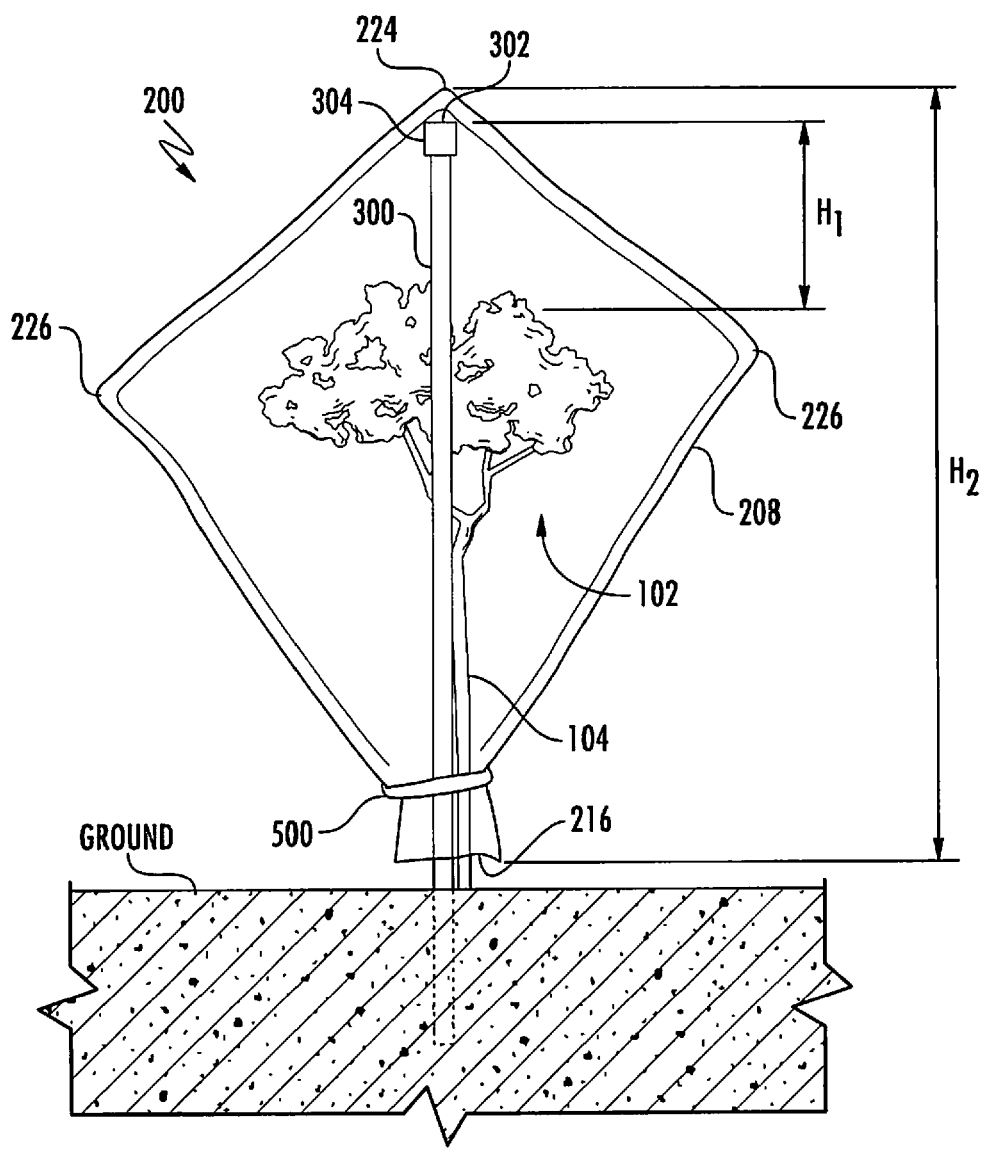
FIG. 10 is a diagrammatic illustration of the first example of the plant cover system enclosing a young tree with the wall of the bag shown as transparent so that the interior of the bag is more clearly visible.

Referring to FIG. 10, the vertical support member 300 may be inserted into the ground like a stake adjacent to the tree 102 so that it extends vertically alongside and in close proximity to the tree 102. The top end 302 upwardly supports the bag 200, keeping the bag 200 from resting on the tree 102 and suspended above the ground. The top of the tree and the top end 302 are offset by a height H1 to allow the tree 102 to grow within the bag 200. The top apex 224 of the bag 200 is positioned atop the top end 302 of the vertical support member 300. The seam 208 provides enough rigidity to the bag 200 to maintain its kite shape. The opening 216 is closed around the trunk 104 of the tree 102 with the closure 500.

The vertical support member 300 may take on many different forms. In the example shown, the vertical support member is a rod-shaped or tubular stake with a plastic or rubber cap 304 on the top end 302 that prevents the vertical support member from causing wear to the bag 200 when the bag 200 moves in the wind, which could generate holes in the bag 200. In other examples, it may include arms extending horizontally from the stake to support the sides of the bag 200 and produce a support frame.

The closure 500 is a string, belt, band, or the like that circumscribes the bag 200 and can be tightened to close the opening 216. The closure 500 may take many different forms such as a drawstring integrally formed with the bag 200, a separate string or rope that can be tied around the bag, a zip or cable tie, a belt, an elastic band, and the like.

The bag's 200 kite shape provides an advantage over other conventional plant covers. The kite shape makes the bag 200 somewhat form fitting to the shape of a tree. It is skinnier at the bottom and top and bulges in the middle to accommodate branches and foliage. The kite shape also provides room for the tree to grow both taller and wider within the bag 200.

The trunk cover 400 encloses the trunk 104 of the tree by encircling it. The trunk cover 400 may be a conventional tubular tree trunk cover or tree trunk wrap. In the example of FIG. 1, the trunk cover 400 has plastic tubular construction and extends from the ground up the trunk. The bag's opening 216 is tightened closed against the trunk cover 400 around the trunk 104. The trunk cover 400 may have a reflective exterior surface. The trunk cover 400 may reduce the amount of pesticides that need to be applied to the tree because it will prevent insect damage.

In an exemplary method of covering a plant using the bag, plant foliage is positioned within the bag 200 by lowering the bag 200 over the plant through the opening 216 in the bag 200. The bag is suspended the bag on a stake positioned next to the plant. The stake extends above the top of the plant. The opening is then closed around a stem or trunk of the plant. To make it easier to position the foliage within the bag 200, the slot 220 may be temporarily opened to increase the size of the opening 216. Once the foliage is within the bag, the slot 220 may then be closed.

The bag 200 is easily removable from the plant or tree when no longer needed even though the plant or tree covered might have grown because the slot 220 can be opened during removal. The bag 200 and vertical support member 300 may then be reused. The bag 200 is lightweight and flexible, allowing for efficient storage and/or shipment. When not in use, the bag 200 may be folded or rolled up for storage.

The scope of the claims is not limited to the only the examples described here. The plant cover system and its components may be embodied in many different forms.

The invention claimed is:

1. An individual plant cover device comprising:
    an enclosure having mesh material to define a plant-receiving cavity therein and comprising
        a first mesh section having
            a closed top end, and
            a first perimeter opposite the closed top end, and
        a second mesh section having
            a second perimeter being integral with the first perimeter of the first mesh section, the first perimeter and the second perimeter partially defining the plant-receiving cavity, and
            a bottom end opposite the closed top end of the first mesh section defining a trunk receiving opening; and
    a support comprising a stake having a first end adjacent a ground surface, and a second end opposite the first end to abut the closed top end of the enclosure, the stake extending vertically through the first and second perimeters and being adjacent a plant.

2. The individual plant cover device of claim 1 wherein the support comprises a plurality of arms extending horizontally from the stake to support the enclosure.

3. The individual plant cover device of claim 1 wherein the first mesh section is dome-shaped.

4. The individual plant cover device of claim 1 wherein the first mesh section is pyramid-shaped.

5. The individual plant cover device of claim 1 wherein the second mesh section comprises tapering sides.

6. The individual plant cover device of claim 1 wherein the stake comprises a tubular stake, and a cap on the second end of the tubular stake.

7. The individual plant cover device of claim 1 further comprising a closure device wrapped around the second mesh section of the enclosure adjacent the bottom end.

8. The individual plant cover device of claim 1 further comprising a fastener adjacent a peripheral edge of the second mesh section of the enclosure and extending from the trunk receiving opening.

9. The individual plant cover device of claim 1 wherein the first perimeter and the second perimeter surround the plant.

10. An individual plant cover assembly comprising:
    a single plant;
    a support extending vertically from a ground surface adjacent the single plant; and
    an enclosure to be positioned over the support and the single plant, the enclosure having mesh material to define a plant-receiving cavity therein and comprising
        a first mesh section having
            a closed top end, and
            a first perimeter opposite the closed top end, and
        a second mesh section having
            a second perimeter being integral with the first perimeter of the first mesh section, the first perimeter and the second perimeter partially defining the plant-receiving cavity, and
            a bottom end opposite the closed top end of the first mesh section defining a trunk receiving opening;
    the support comprising a stake having a first end adjacent the ground surface, and a second end opposite the first end to abut the closed top end of the enclosure, the stake extending vertically through the first and second perimeters.

11. The individual plant cover assembly of claim 10 wherein the support comprises a plurality of arms extending horizontally from the stake to support the enclosure.

12. The individual plant cover assembly of claim 10 wherein the first mesh section is dome-shaped.

13. The individual plant cover assembly of claim 10 wherein the first mesh section is pyramid-shaped.

14. The individual plant cover assembly of claim 10 wherein the second mesh section comprises tapering sides.

15. The individual plant cover assembly of claim 10 wherein the stake comprises a tubular stake, and a cap on the second end of the tubular stake.

16. The individual plant cover assembly of claim 10 wherein the enclosure further comprises a closure device wrapped around the second mesh section of the enclosure adjacent the bottom end.

17. A method of covering a plant with an individual plant cover device, the method comprising:
    providing the individual plant cover device with an enclosure comprising enclosure having mesh material to define a plant-receiving cavity therein, the enclosure comprising
        a first mesh section having a closed top end, and a first perimeter opposite the closed top end, and
        a second mesh section having
            a second perimeter being integral with the first perimeter of the first mesh section, the first perimeter and the second perimeter partially defining the plant-receiving cavity, and a bottom end opposite the closed top end of the first mesh section defining a trunk receiving opening;

positioning the plant within the individual plant cover device by lowering the enclosure over the plant through the trunk receiving opening; and suspending the enclosure with a support comprising a stake having a first end adjacent a ground surface, and a second end opposite the first end to abut the closed top end of the enclosure, the stake extending vertically through the first and second perimeters.

18. The method of claim 17 wherein the support comprises a plurality of arms extending horizontally from the stake to support the enclosure.

19. The method of claim 17 wherein the first mesh section is one of dome-shaped or pyramid-shaped.

20. The method of claim 17 wherein the second mesh section comprises tapering sides.

21. An individual plant cover device comprising:

an enclosure having mesh material to define a plant-receiving cavity therein and comprising a first mesh section having a closed top end, and a first perimeter opposite the closed top end, and a second mesh section having a second perimeter being integral with the first perimeter of the first mesh section, the first perimeter and the second perimeter partially defining the plant-receiving cavity, and a bottom end opposite the closed top end of the first mesh section defining a trunk receiving opening, the mesh material comprising material that is water permeable and permits light transmissivity; and a support extending vertically from a ground surface, through the first and second perimeters and to abut the closed top end of the enclosure.

22. The individual plant cover device of claim 21 wherein the support comprises a vertical support extending vertically from the ground surface to abut the closed top end of the enclosure, and a plurality of arms extending horizontally from the vertical support to support the enclosure.

23. The individual plant cover device of claim 21 wherein the support wherein the first mesh section is dome-shaped.

24. The individual plant cover device of claim 21 wherein the support wherein the first mesh section is pyramid-shaped.

\* \* \* \* \*

UNITED STATES PATENT AND TRADEMARK OFFICE
CERTIFICATE OF CORRECTION

PATENT NO. : 12,058,965 B1  
APPLICATION NO. : 18/161166  
DATED : August 13, 2024  
INVENTOR(S) : Thompson et al.

Page 1 of 1

It is certified that error appears in the above-identified patent and that said Letters Patent is hereby corrected as shown below:

In the Claims

Column 6, Line 58 Claim 17,    Delete: "comprising enclosure"

Signed and Sealed this  
Twenty-fifth Day of March, 2025

Coke Morgan Stewart  
*Acting Director of the United States Patent and Trademark Office*